US011397767B2

(12) United States Patent
Cremer et al.

(10) Patent No.: US 11,397,767 B2
(45) Date of Patent: Jul. 26, 2022

(54) BROADCAST PROFILING SYSTEM

(71) Applicant: Gracenote, Inc., Emeryville, CA (US)

(72) Inventors: Markus K. Cremer, Orinda, CA (US);
Rishabh Sharma, San Francisco, CA (US); Michael Yeehua Chien, San Mateo, CA (US); Suresh Jeyachandran, Alameda, CA (US); Paul Emmanuel Quinn, Emeryville, CA (US)

(73) Assignee: Gracenote, Inc., Emeryville, CA (US)

( * ) Notice: Subject to any disclaimer, the term of this patent is extended or adjusted under 35 U.S.C. 154(b) by 231 days.

(21) Appl. No.: 16/893,329

(22) Filed: Jun. 4, 2020

(65) Prior Publication Data

US 2020/0301964 A1 Sep. 24, 2020

Related U.S. Application Data

(63) Continuation of application No. 14/982,293, filed on Dec. 29, 2015, now Pat. No. 10,685,058.

(60) Provisional application No. 62/099,398, filed on Jan. 2, 2015.

(51) Int. Cl.
*G06F 16/00* (2019.01)
*G06F 16/683* (2019.01)
*G06F 16/638* (2019.01)

(52) U.S. Cl.
CPC .......... *G06F 16/683* (2019.01); *G06F 16/639* (2019.01)

(58) Field of Classification Search
CPC .............................. G06F 16/683; G06F 16/639
See application file for complete search history.

(56) References Cited

U.S. PATENT DOCUMENTS

| 4,230,990 A | 10/1980 | Lert, Jr. et al. |
| 9,608,824 B2 | 3/2017 | Garside et al. |

(Continued)

FOREIGN PATENT DOCUMENTS

| CN | 105404681 | 3/2016 |
| JP | H02500875 | 3/1990 |

(Continued)

OTHER PUBLICATIONS

Lidy et al., Visually Profiling Radio Stations, Vienna University of Technology, Proceedings of the 7th Int'l Conference on Music Information Retrieval (2006) (Year: 2006).*

(Continued)

*Primary Examiner* — Tyler J Torgrimson
(74) *Attorney, Agent, or Firm* — Hanley, Flight & Zimmerman, LLC

(57) ABSTRACT

Methods, apparatus, systems and articles of manufacture are disclosed for a broadcast profiling system. An example method includes comparing a preference included in a user profile with a portion of a content station profile to determine whether the preference satisfies a threshold difference from the portion of the content station profile, the content station profile including (1) a first characteristic of first broadcast data associated with a first time context and a first count associated with first identifying information and (2) a second characteristic of second broadcast data associated with a second time context and a second count associated with second identifying information; in response to the threshold difference being satisfied, generating a station recommendation for a user associated with the user profile; and transmitting an instruction associated with the user, the instruction including the station recommendation, the instruction configured to cause a radio pre-set to be adjusted.

20 Claims, 16 Drawing Sheets

(56) References Cited

U.S. PATENT DOCUMENTS

| | | | |
|---|---|---|---|
| 9,639,536 B2 | 5/2017 | Jellison, Jr. | |
| 9,680,891 B2 | 6/2017 | Bryant et al. | |
| 9,684,715 B1 | 6/2017 | Ross et al. | |
| 10,685,058 B2 | 6/2020 | Cremer et al. | |
| 2001/0044804 A1 | 11/2001 | Fitzgerald et al. | |
| 2002/0099555 A1 | 7/2002 | Pitman et al. | |
| 2003/0051238 A1 | 3/2003 | Barone, Jr. | |
| 2003/0105809 A1* | 6/2003 | Yoshii | H04L 67/325 |
| | | | 348/E7.071 |
| 2004/0116088 A1 | 6/2004 | Ellis et al. | |
| 2007/0011699 A1 | 1/2007 | Kopra et al. | |
| 2008/0168503 A1 | 7/2008 | Sparrell | |
| 2009/0064227 A1 | 3/2009 | Eronen et al. | |
| 2009/0286526 A1 | 11/2009 | Matsunaga | |
| 2010/0042688 A1 | 2/2010 | Maghraby | |
| 2013/0102242 A1 | 4/2013 | Anzures et al. | |
| 2013/0290502 A1 | 10/2013 | Bilobrov et al. | |
| 2014/0196085 A1 | 7/2014 | Dunker et al. | |
| 2014/0280265 A1 | 9/2014 | Wang | |
| 2015/0188970 A1 | 7/2015 | Kowshik et al. | |
| 2017/0235825 A1* | 8/2017 | Gordon | G06F 16/433 |
| | | | 707/769 |

FOREIGN PATENT DOCUMENTS

| | | |
|---|---|---|
| KR | 20130139675 | 12/2013 |
| WO | 0175603 | 10/2001 |

OTHER PUBLICATIONS

Haitsma et al., "Robust Audio Hashing for Content Identification," Philips Research, 8 pages.

International Bureau, "International Preliminary Report on Patentability," issued in connection with International Patent Application No. PCT/US2015/068088, dated Jul. 4, 2017, 10 pages.

U.S. Appl. No. 62/099,398, "Approaches for Categorizing Content Stations," filed Jan. 2, 2015, 27 pages.

Lidy et al., "Visually Profiling Radio Stations," Institute of Software Technology & Interactive Systems, Proceedings of the 7th International Conference on Music Information Retrieval, 2006, 7 pages.

United States Patent and Trademark Office, "Notice of Allowance" in connection with U.S. Appl. No. 14/982,293 dated Feb. 10, 2020, 14 pages.

United States Patent and Trademark Office, "Non-final Office Action" in connection with U.S. Appl. No. 14/982,293 dated Sep. 4, 2019, 18 pages.

United States Patent and Trademark Office, "Non-final Office Action" in connection with U.S. Appl. No. 14/982,293 dated Jul. 27, 2018, 18 pages.

United States Patent and Trademark Office, "Final Office Action" in connection with U.S. Appl. No. 14/982,293 dated May 13, 2019, 18 pages.

International Searching Authority, "International Search Report and Written Opinion" issued in connection with International Patent Application No. PCT/US2015/068088, dated Feb. 25, 2016, 11 pages.

* cited by examiner

300

```
Content Station Event Payload
{
"RADIO_STATION_ID":"KIOI-FM",
"RADIO_STATION_TUI":"123456789",
"TIMESTAMP":"20150803161514",
"TRACK_TUI":"540270805",
"TRACK_TUI_TAG":"5032234756900C2C3AF78CA9AEDEBC13",
"ALBUM_TITLE":"Promo Only Mainstream Radio August 2015",
"ARTIST_NAME":"Various Artists",
"TRACK_TITLE":"Cool For The Summer",
"GENRE_MC":"2929",
"ORIGIN_MC":"4115",
"ERA_MC":"2649",
"ARTIST_TYPE_MC":"23962",
"MOOD_MC":"34169",
"TEMPO_MC":"34105",
"BROADCAST_METADATA":"StreamTitle='Demi Lovato - text=\"Cool For The
Summer\"song_spot=\"M\"MediaBaseId=\"2117353\" itunesTrackId=\"0\"
amgTrackId=\"-1\"amgArtistId=\"0\" TAID=\"42340\"TPID=\"33258898\"
cartcutId=\"0884935001\"';"
}
```

FIG. 3

Content Station Event Payload

```
401 → {"timestamp": "2015-08-30T12:40:00+00:00", "stationid": "101",
      "callsign" : "KBAY-FM", "gnid" : "123-APPLE"}
403 → {"timestamp": "2015-08-30T12:45:00+00:00", "stationid": "101",
      "callsign" : "KBAY-FM", "gnid" : "456-BLUEBERRY"}
405 → {"timestamp": "2015-08-30T12:53:00+00:00", "stationid": "101",
      "callsign" : "KBAY-FM", "gnid" : "123-APPLE"}
407 → {"timestamp": "2015-08-30T13:06:00+00:00", "stationid": "101",
      "callsign" : "KBAY-FM", "gnid" : "555-BANANA"}
409 → {"timestamp": "2015-08-30T13:15:00+00:00", "stationid": "101",
      "callsign" : "KBAY-FM", "gnid" : "123-APPLE"}
```

```
JSON Serialized Persona
{
"version" : "1.0",
"id" : "101",
"name" : "KBAY-FM",
"persona_type" : "Music",
"persona_schema" : [
{"type" : "1", "name" : "root", "level": "0"},
{"type" : "2", "name" : "genre_mc", "level": "1"},
{"type" : "3", "name" : "era_mc", "level": "2"},
{"type" : "4", "name" : "mood_mc", "level": "3"},
{"type" : "5", "name" : "hour_of_day", "level": "4"},
{"type" : "6", "name" : "day_of_week", "level": "4"},
{"type" : "7", "name" : "month_of_year", "level": "4"}
],
"persona" : {
```

*FIG. 6A*

BROADCAST PROFILING SYSTEM

RELATED APPLICATIONS

This patent arises from a continuation of U.S. patent application Ser. No. 14/982,293, (Now U.S. Pat. No. 10,685,058) which was filed on Dec. 29, 2015, which arises from U.S. Provision Patent Application Serial No. 62/099,398, which was filed on Jan. 2, 2015. U.S. patent application Ser. No. 14/982,293 and U.S. Provisional Patent Application Ser. No. 62/099,398 are hereby incorporated herein by reference in its entirety. Priority to U.S. patent application Ser. No. 14/982,293 and U.S. Provisional Patent Application Ser. No. 62/099,398 is hereby claimed.

TECHNICAL FIELD

The present disclosure relates generally to a mechanism for receiving, categorizing, and profiling broadcast data.

BACKGROUND

Users can face difficulties in finding content stations (e.g., radio stations) that play or stream content that the users prefer. Typically, users may rely on categories (e.g., pop music station) that have been defined by the content stations themselves to determine which station to access. However, such self-defined categories do not necessarily reflect the type of content that is actually played by such stations, since the theme of a content station may change over time.

BRIEF DESCRIPTION OF THE DRAWINGS

Various ones of the appended drawings merely illustrate example embodiments of the present disclosure and should not be considered as limiting its scope.

FIG. 3 is a diagram illustrating a content station event payload, according to some example embodiments.

FIG. 4 is a diagram illustrating a content station event payload, according to some example embodiments.

FIGS. 6A-6D are diagrams of a JSON serialized persona, according to some example embodiments.

DETAILED DESCRIPTION

Systems and methods described herein relate to receiving, categorizing, and profiling broadcast data. In one example embodiment, a system may receive broadcast data for a content station, such as a song playing on a radio station. The system may determine that the broadcast data comprises a change in content. For instance, the system may determine that a new song is playing on the radio station. The system may determine identifying information of the song, such as a song identifier, song name, etc. The system may use the identifying information of the song to look up characteristics of the song such as a genre, era, mood, etc. The system may store the identifying information and characteristics of the song and then increment characteristics in a persona (e.g., datastore) associated with the content station. The system may generate a profile of the content station based on the persona (e.g., datastore) of the content station.

Figure 1:
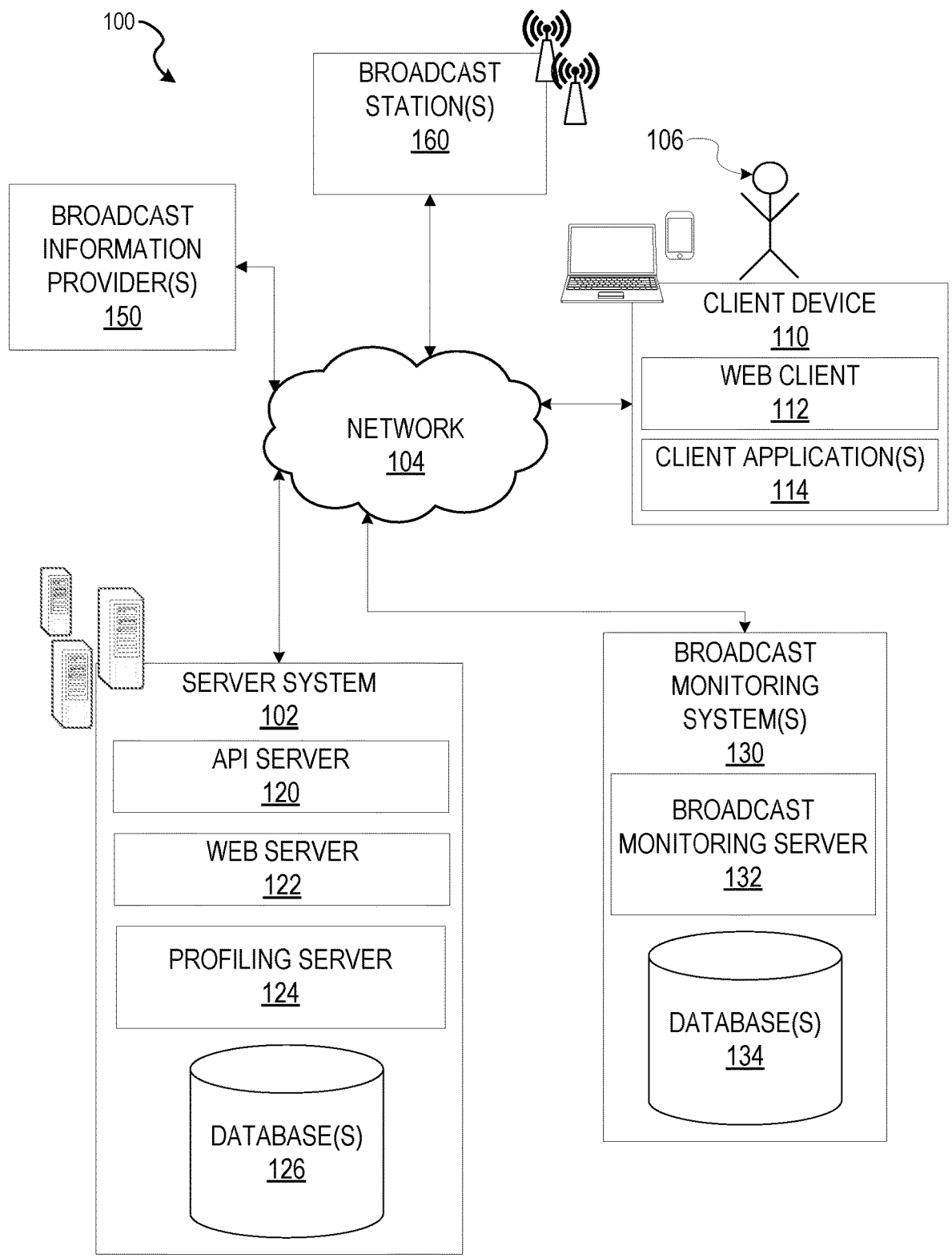
FIG. 1 is a block diagram illustrating a networked system, according to some example embodiments, to profile broadcast data.

FIG. 1 is a block diagram illustrating a networked system 100, according to some example embodiments, configured to receive, categorize, and profile broadcast data. The system 100 may include one or more client devices, such as client device 110. The client device 110 may comprise, but is not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to search and display location information, maps, or content station information (e.g., music stations, TV stations, etc.), to view content stations, to listen to content of content stations, etc.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., broadcast monitoring system 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, an over-the-air network, a radio network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The one or more client applications 114 (also referred to as "apps") may include, but are not limited to, a web browser, a messaging application, an electronic mail (email) application, an e-commerce site application, a mapping or location application, a media player application, a content station application, and the like. In some embodiments, the one or more client applications 114 may be included in a given one of the client devices 110, and configured to locally provide the user interface and at least some of the functionalities of the system 100, with the client application 114 configured to communicate with other entities in the system 100 (e.g., broadcast monitoring system 130, server system 102, etc.), on an as needed basis, for data and/or processing capabilities not locally available (e.g., access to content station information, to authenticate a user 106, to verify a method of payment, etc.). Conversely, the one or more client applications 114 may not be included in the client device 110, and then the client device 110 may use its web browser to access the one or more applications hosted on other entities in the system 100 (e.g., server system 102, etc.).

The system 100 may further include one or more broadcast monitoring system(s) 130. The broadcast monitoring system(s) 130 may include a radio tuner (not shown) for receiving and/or recording multiple radio streams simultaneously. The broadcast monitoring system(s) 130 may be configured to obtain content being played or streamed (e.g., broadcast data) by broadcast stations 160 (e.g., content stations such as broadcast radio stations, etc.) and any information (e.g., metadata) associated with such content. For example, the broadcast monitoring system(s) 130 may obtain such content and/or information through receivers, such as antennas or dishes for capturing content (e.g., AM/FM radio, satellite data, etc.). Generally, for content stations that transmit content (e.g., media content), for example, over radio frequencies, the broadcast monitoring system 130 may be placed within a transmitting range of such content stations to be able to obtain and analyze the content being played by the station. The broadcast monitoring system(s) 130 may be placed in various geographic regions to capture and analyze content played by a content station that is able to be received, for example, by an antenna, in that region.

In some embodiments, the broadcast monitoring system(s) 130 may be configured to analyze the content and/or information (e.g., metadata) associated with the content to determine information describing the content (e.g., identifying information of broadcast data). For example, for musical content, the broadcast monitoring system(s) 130 may determine the artist, song name, and album name, among other such information. The broadcast monitoring system(s) 130 may also determine information describing the type of content being played (e.g., characteristics of the broadcast data). For example, for any given song played by a content station, the broadcast monitoring system(s) 130 may determine the genre (e.g., rock, jazz, classical, country, etc.) to which the song corresponds. The broadcast monitoring system(s) 130 may also determine the era (e.g., time period such as 60s, 70s, 80s, 90s, etc.) to which the song corresponds. Typically, the era for a song may correspond to the time period during which the song was released or became popular. The broadcast monitoring system(s) 130 may also determine any mood or moods that the song reflects. The moods associated with the song may describe any sentiment the song evokes (e.g., happy, melancholy, upbeat, energetic, calming, etc.). Genre, era, and mood may be some examples of categorizing content or characteristics of broadcast data. Each category (e.g., genre, era, mood, etc.) may have multiple sub-categories.

The broadcast monitoring system(s) 130 may identify and record data for media received from all available radio broadcast sources. The broadcast monitoring system(s) 130 may send this gathered data to a server system 102 (e.g., via an API server 120 or directly to a profiling server 124). The server system 102 may then utilize this data to develop content station personas (e.g., datastores) and profiles. These content station personas and profiles may then be used to allow recommendations of broadcast content stations to consumers. Further, broadcast monitoring may be used to allow clients and users to quickly and cheaply identify media content being broadcast (e.g., broadcast data) on a select content station without the need for full audio recognition. The broadcast monitoring system(s) 130 may include a broadcast monitoring server 132 to perform the functions of the broadcast monitoring system 130, and one or more database(s) 134 to store broadcast data, identifying data, characteristics of broadcast data, or the like.

The server system 102 may provide server-side functionality via the network 104 (e.g., the Internet or a wide area network (WAN)) to the one or more broadcast monitoring system(s) 130 and/or the one or more client devices 110. The server system 102 may include an application program interface (API) server 120, a web server 122, and a profiling server 124, that may be communicatively coupled with one or more databases 126. The databases 126 may be storage devices that store information such as content station data, broadcast data, identifying information associated with broadcast data, characteristics of broadcast data, content station personas, content station profiles, etc. The profiling server 124 may provide functionality to perform profiling of content stations. The profiling server 124 may access the one or more databases 126 to retrieve stored data to use in profiling calculations and analysis of personas and profiles for content stations. Moreover, some or all of the functions described herein as being performed by the broadcast monitoring system 130 or broadcast monitoring server 132 may be performed by the server system 102.

In addition to receiving and gathering broadcast data from the broadcast station(s) 160, the system 100 may also include one or more broadcast information provider(s) 150 that may provide broadcast information. The broadcast information providers 150 may have accessible broadcast data through an Internet stream of a radio (or other media) broadcast, textual playlists of media played on a content station which may be matched to other data, or other data. The broadcast itself is useful since it is received at the same instant for all listeners of the broadcast. Internet streams of a broadcast may also be useful since they may be more accessible and may also be near-real time. It is possible, however, that some Internet streams may have a delay from the actual broadcast. Textual or other sources may also be useful but may or may not be in real time.

Figure 2:
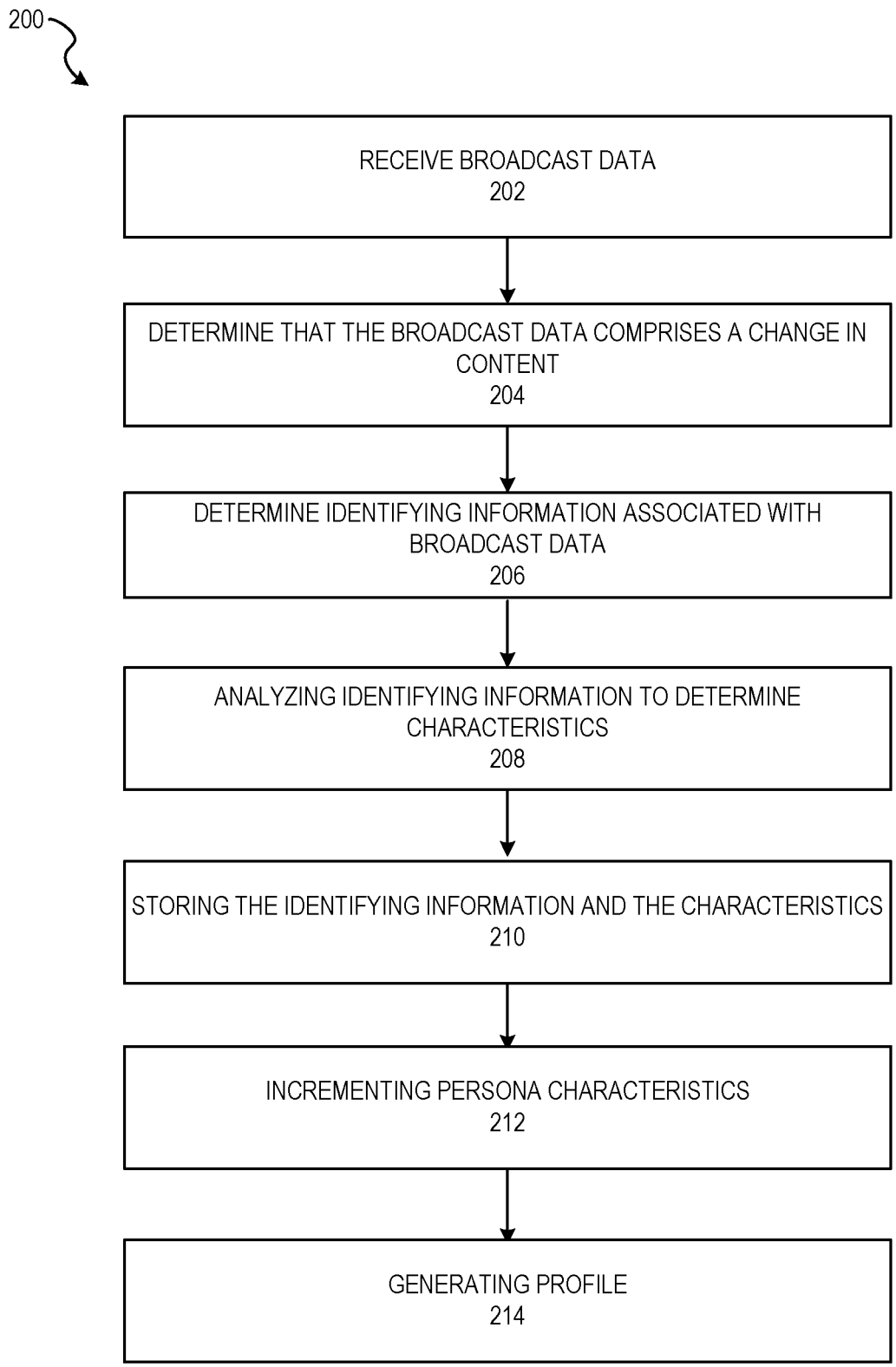
FIG. 2 is a flowchart illustrating aspects of a method, according to some example embodiments, for generating a profile for a content station.

FIG. 2 is a flow chart illustrating aspects of a method 200, according to some example embodiments, for receiving, identifying, and storing broadcast data, and generating profile information for content stations. For illustrative purposes, the method 200 is described with respect to the networked system 100 of FIG. 1. It is to be understood that the method 200 may be practiced with other system configurations in other embodiments.

As shown in operation 202, a broadcast monitoring system 130 may receive broadcast data, for example, at a broadcast monitoring server 132. The broadcast monitoring server 132 may receive the broadcast data from broadcast station(s) 160 and/or from broadcast information provider(s) 150. The broadcast monitoring server 132 may be consistently listening to a broadcast or may listen only at predetermined time intervals (e.g., every 10 seconds or 30 seconds, etc.). The broadcast data may include music, voice, video, and/or other broadcast media. In one example embodiment, the broadcast data may include music or other audio from a broadcast radio station.

In operation 204, the broadcast monitoring server 132 may determine that the broadcast data comprises a change in content. For example, the broadcast monitoring server 132 may detect a new music event such as when the content station stops broadcasting one song and starts broadcasting a new song. The broadcast monitoring server 132 may detect the new song by comparing identifying information of the new song to previous broadcast data that was stored in one or more databases 134 in the broadcast monitoring system 130 to determine that the new broadcast data is different from the previous broadcast data from the content station. The previous data may be a different song, an advertisement, news, etc.

As shown in operation 206, the broadcast monitoring server 132 may determine identifying information associated with the broadcast data. For example, the broadcast monitoring server 132 may identify a song in the broadcast data by recognizing an audio fingerprint of the song, using metadata associated with the song, utilizing data from the broadcast information provider(s) 150, or other means. The broadcast monitoring server 132 may determine the identifying information in substantially near-real time from when the data is broadcast. Identifying information may include one or more of a song identifier (ID) such as a track unique identifier (TUI), track title, album title, artist name, etc.

As shown in operation 208, the broadcast monitoring server 132 may analyze the identifying information to determine characteristics of the broadcast data. In one example, the broadcast monitoring server 132 may look up the identifying information in one or more databases 134, 126, or other sources to determine the characteristics (e.g., genre, origin, era, artist type, mood, tempo, etc.) of the broadcast data. The broadcast monitoring server 132 may store the identifying information and the characteristics of the broadcast data in the one or more databases 134, as shown in operation 210. The broadcast monitoring server 132 may also store a timestamp of the broadcast data. The timestamp may be the time the broadcast data was received, the time the song started playing, etc. The broadcast monitoring server 132 may also store any content station identification information (e.g., radio station identifier, radio station TUI, radio station name, etc.).

The broadcast monitoring server 132 may cause a content station persona (e.g., a datastore for a content station) to be created or an existing content station persona to be updated by sending the identifying information to a server system 102, for example, to a profiling server 124 to utilize in creating or updating a content station persona. For example, the broadcast monitoring server 132 may send information similar to the content and format shown in FIG. 3. FIG. 3 shows a content station event payload 300 that may be sent to the profiling server 124 whenever new broadcast data is recognized (e.g., when a new song is playing). The content station event payload 300 may include some or all of the information shown in FIG. 3. The RADIO_STATION_ID may be the name of the radio station (e.g., "KIOI-FM"), the RADIO_STATION_TUI may be the unique identifier for the radio station, the TIMESTAMP may be the time the broadcast data started broadcasting or was received, the TRACK_TUI may be the track unique identifier, the TRACK_TUI_TAG may be used for encryption purposes, the ALBUM_TITLE may be the title of an album corresponding to the track (e.g., the particular album that includes the song), the ARTIST_NAME may be the name of the artist associated with the track, the TRACK TITLE may be the name of the track/song, the GENRE_MC may be the genre of the track, the ORIGIN_MC may be the origin of the track, the ERA_MC may be the era for the track, the ARTIST_TYPE_MC may be the artist type, the MOOD_MC may be the mood of the track, the TEMPO_MC may be the tempo of the track, and the BROADCAST METADATA may include any data received with the broadcast data or other source of broadcast data.

The broadcast monitoring server 132 may only need to send a subset of the information. For example, the broadcast monitoring server 132 may only send the RADIO_STATION_TUI, TRACK_TUI, and TIMESTAMP, since this information may be sufficient for identifying the content station and track being broadcast.

Returning to FIG. 2, the profiling server 124 may create a new persona for the content station or increment persona characteristics of an existing persona for the content station, as shown in operation 212. The creation of a new content station persona and updating of existing persona characteristics will be discussed in with reference to FIG. 4 and FIGS. 5A-5F. From the persona, a profile may be generated (operation 214), as also described below.

The profiling server 124 may first determine whether there is an existing persona for the content station. If there is not an existing persona, the profiling server 124 may create a new content station persona and add the broadcast data information received from the broadcast monitoring server 132 to the persona. For example, the profiling server 124 may have received five events 401-409 from monitoring a particular content station (e.g., radio station KBAY-FM) for a particular amount of time (e.g., 35 minutes), as shown in FIG. 4.

Figure 5A:
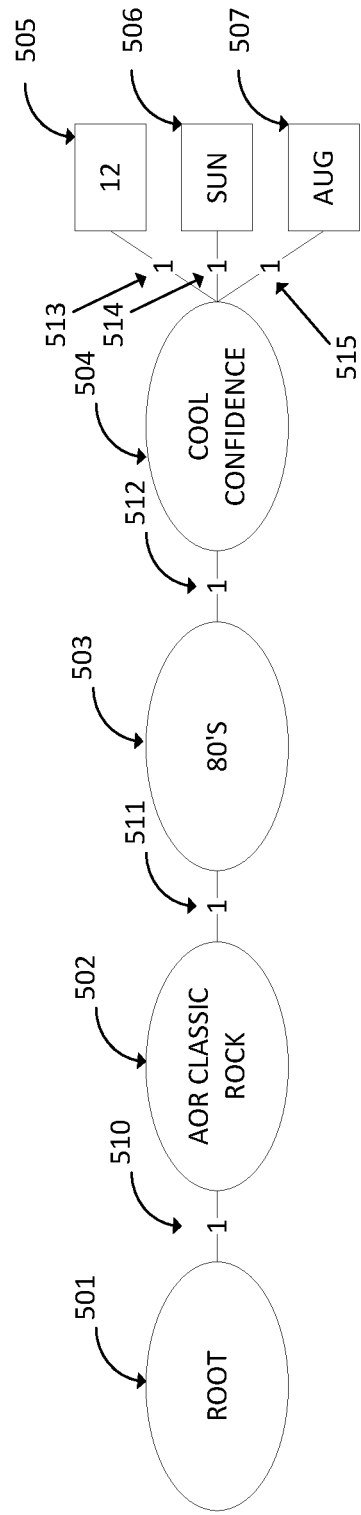
FIGS. 5A-5F are diagrams illustrating a data structure of a content station persona, according to some example embodiments.

From the first event 401 (e.g., identifier or gnid "123-APPLE"), the profiling server 124 may determine the associated genre, era, and mood (e.g., from stored data associated with the gnid). For example, the genre may be "AOR Classic Rock," the era may be "80s," and the mood may be "Cool Confidence." In an example embodiment, the data may be stored in a data structure similar to a variant of a Trie as shown in FIG. 5A. Trie is a special tree; its name comes from the work "retrieval" since this structure serves as an efficient pattern-retrieval machine. The term "persona" is used here to describe this Trie structure.

In this example case, the Trie is four levels, from the root node 501. The first level may have the genre nodes 502, the second level may have the era nodes 503, the third level may have the mood nodes 504, and the fourth level may contain time context nodes 505-507. The time context nodes may consist of an "hour of day" node 505, a "day of week" node 506, and a "month of year" node 507 to capture the time context of an event. In some embodiments, the time context nodes may also include the year (not shown). There may be several counts associated with the nodes. For example, a count 510 may indicate the count at the genre node 502. A count 511 may indicate the count at the era node 503, a count 512 the count at the mood node 504, and counts 513-515 the counts at the time context nodes 505-507.

From the second event 403 (e.g., identifier or gnid "456-BLUEBERRY"), as shown in FIG. 4, the profiling server 124 may determine the associated genre, era, and mood (e.g., from stored data associated with the gnid). For example, the genre may be "AOR Classic Rock," the era may be "90s," and the mood may be "Powerful/Heroic."

Figure 5B:
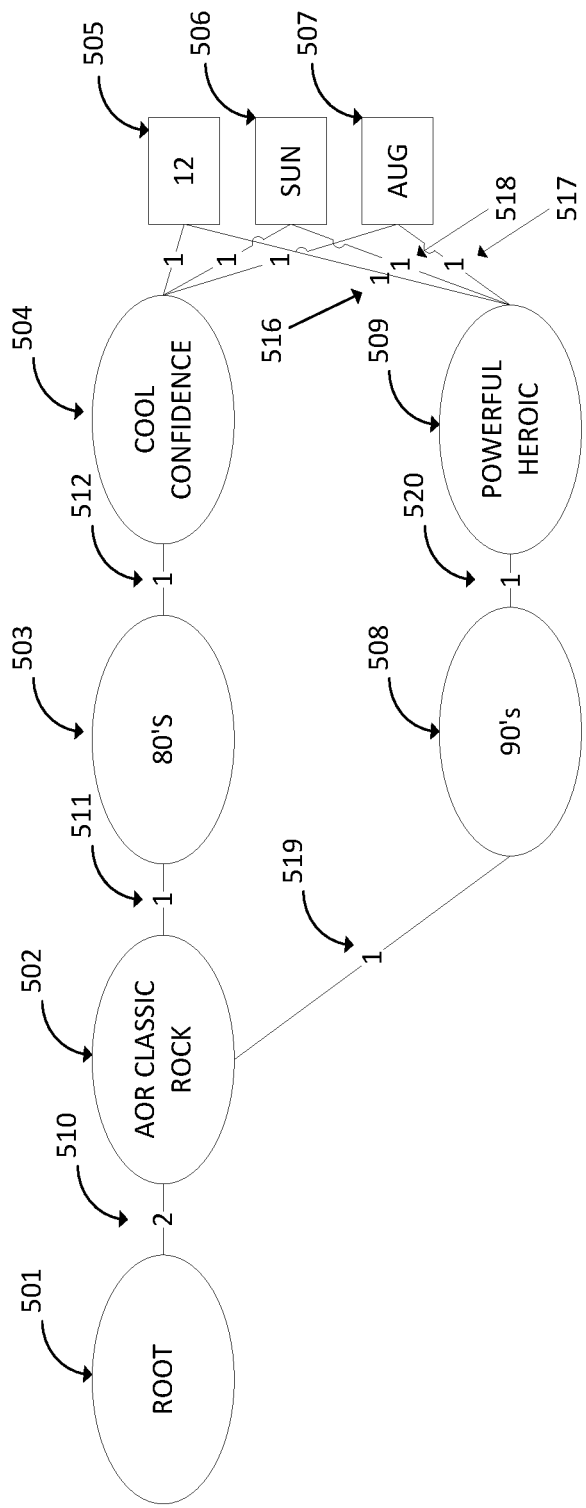

Adding this to the persona may produce the structure shown in FIG. 5B. Since the second event has the same genre as the first event, the persona may use the existing genre node 502 instead of creating a new one. This is how the Trie structure saves memory space when there are repeated patterns. The count 510 may be incremented accordingly. A new era node 508 may be created for the era "90s" since it is different from the era "80s," and a new mood node 509 may be created for the mood "Powerful/Heroic," since it is different from the previous mood. The associated counts (e.g., 510, 516-520) may be established and incremented accordingly.

Figure 5C:
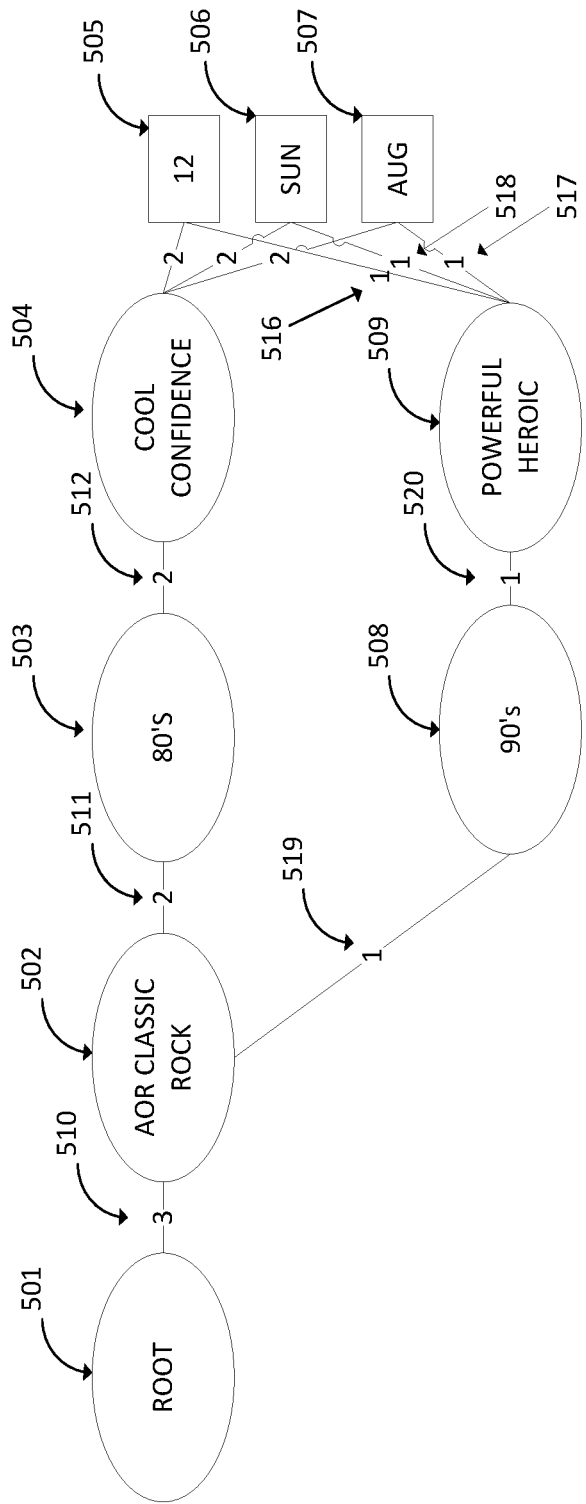
Figure 5D:
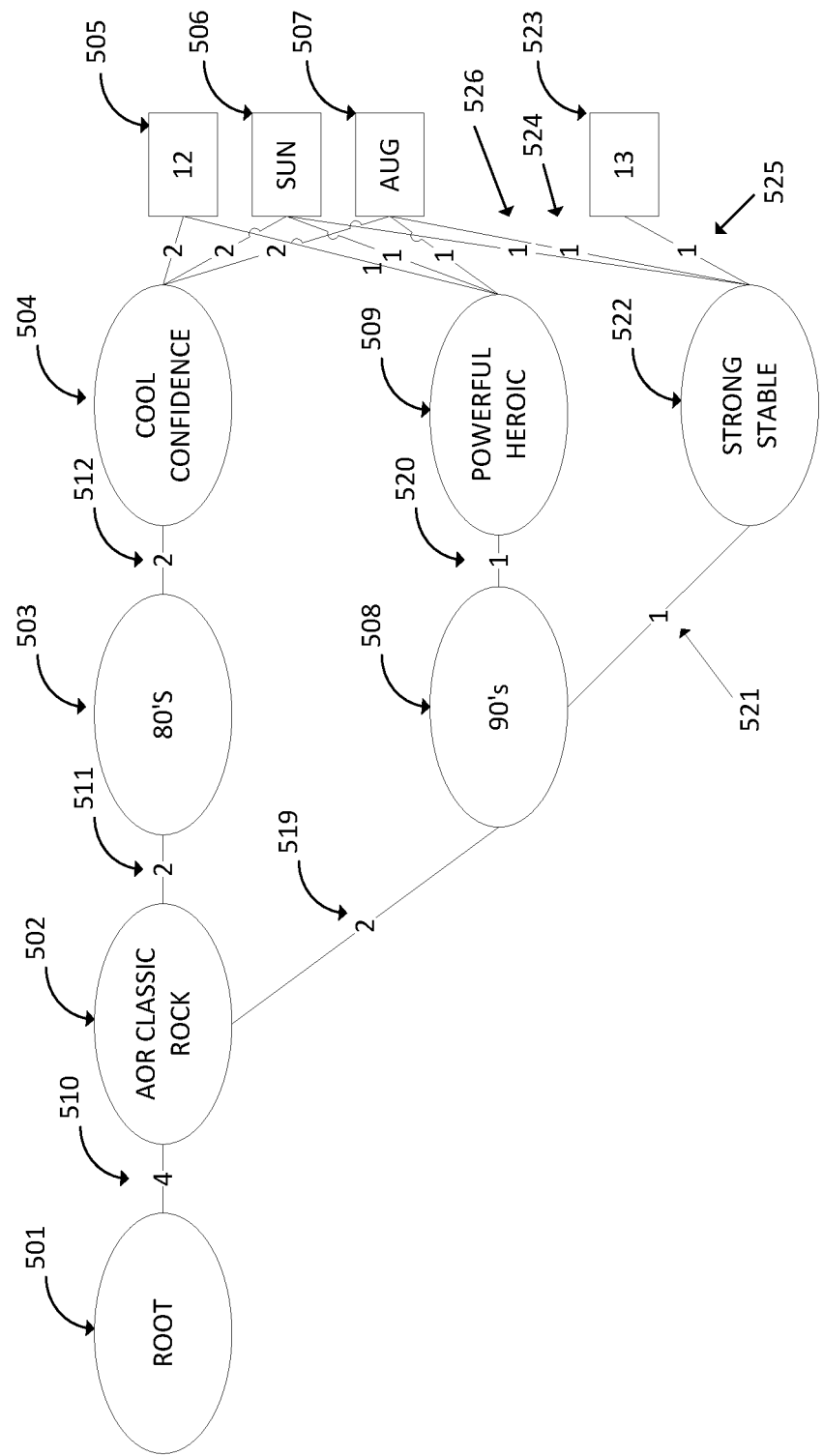

The third event 405 (e.g., identifier or gnid "123-APPLE") is the same as the first event 401. Thus, the profiling server 124 may just increase the count of relevant nodes, as shown in FIG. 5C.

For the fourth event 407 (e.g., identifier or gnid "555-BANANA"), the profiling server 124 may determine that the associated genre, era, and mood are "AOR Classic Rock," "90s," and "Strong/Stable" respectively. Adding this to the persona will produce the structure shown in FIG. 5D. Only a new mood node 522 ("Strong/Stable") and a new time context node 523 were created in this case, because the genre "AOR Classic Rock" and the era "90s" already exist in the persona. The associated counts (e.g., 510, 519, 521, 524-526) for this event may be established and incremented accordingly.

The last event 409 shown in FIG. 4 has the same gnid as the first event 401 but with a different "hour of day" time context. Thus, adding this event to the persona may produce the structure shown in FIG. 5E. As can be seen, only one link from "13" (node 523) to "Cool Confidence" (node 504) has been created in the persona, and the relevant counts (e.g., 510, 511, 512, 514, 515, 525, 527) have been updated for this insertion.

In FIGS. 5A-5E the genre, era, and mood values were represented as string values (e.g., "AOR Classic Rock") for ease of understanding. What may actually be stored in the Trie, however, may be their master codes, as shown in FIG. 5F. Also, the day Sunday is shown as numerical value "1" and the month August as numerical value "8" in FIG. 5F.

Figure 5E:
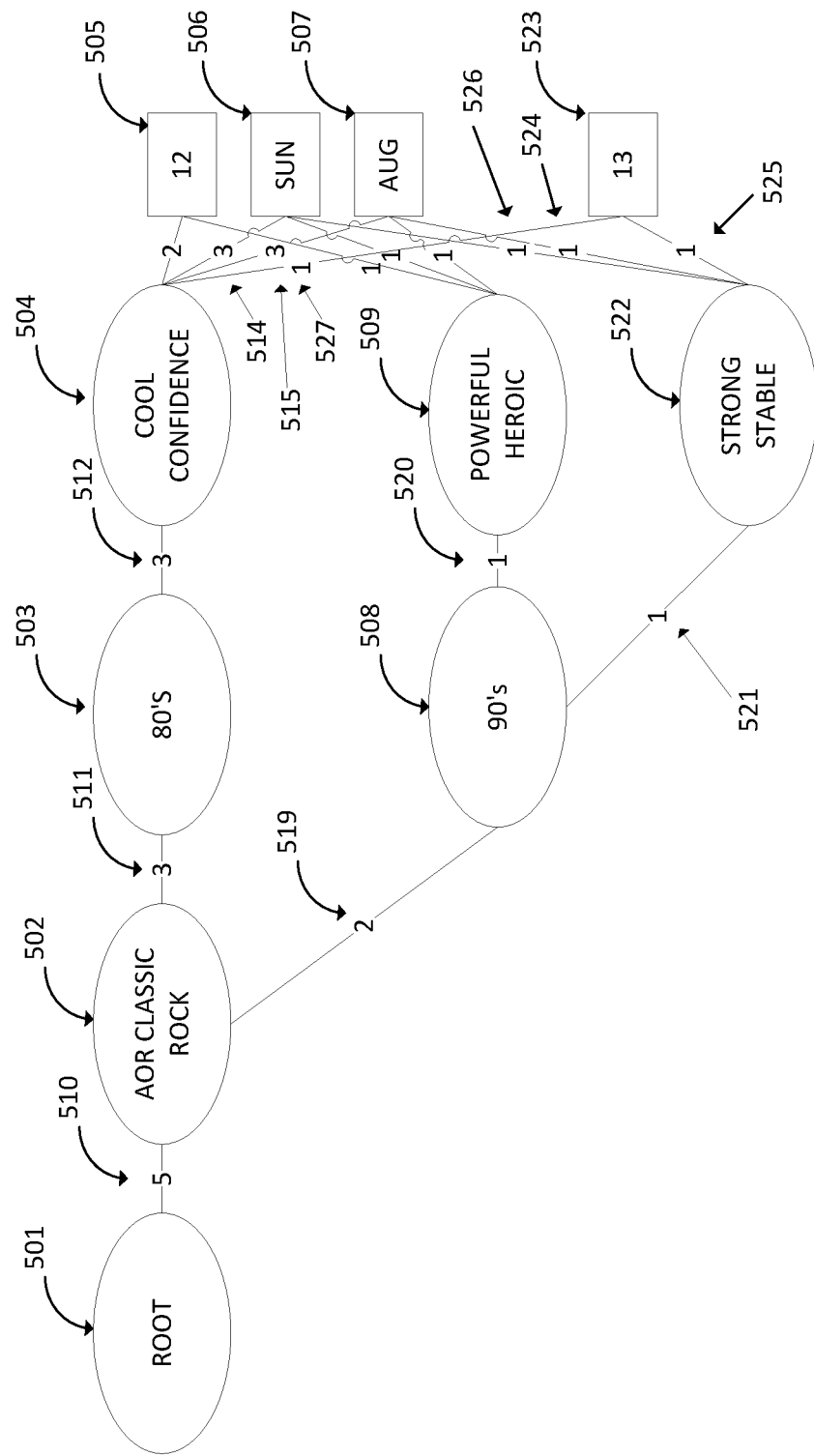
Figure 5F:
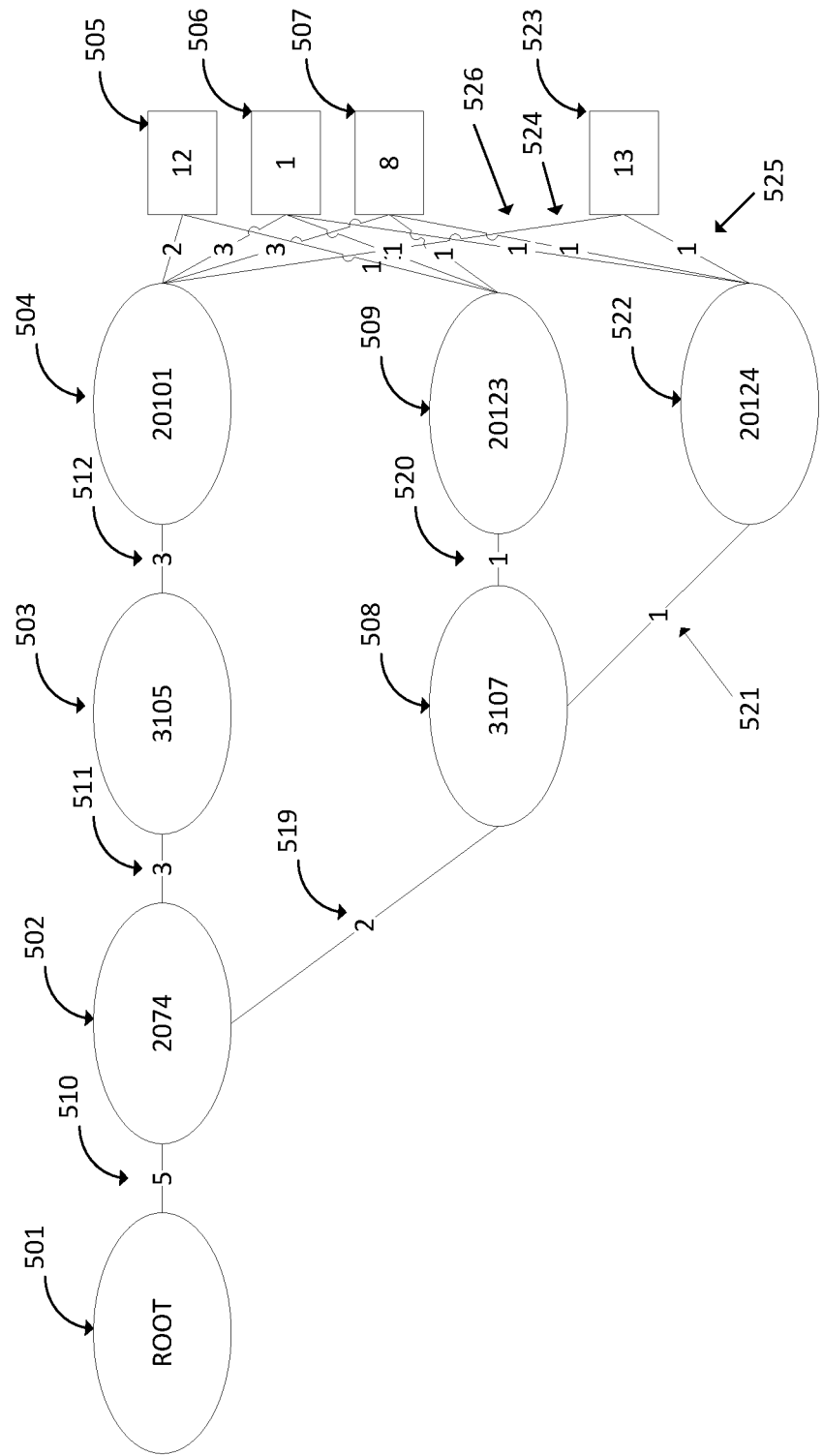

The structure shown in FIG. 5E or FIG. 5F may then be converted into a serialized persona such as the JSON Serialized Persona as shown in FIGS. 6A-6D. The exemplary JSON Serialized Persona 600 illustrated in these figures may be a persona for a content station (e.g., radio station) KBAY-FM 101. For ease of viewing, this persona has been split into three figures.

The first part of the JSON Serialized Persona 600 may be a description of the content station as shown in FIG. 6A. For example, a version number may be identified (e.g., 1.0), along with a content station identifier (e.g., 101), and a content station name (e.g., KBAY-FM). A persona type may also be included to indicate a media type for the content station (e.g., music, video, TV, sports, news, etc.) or a combination of media types. For example, the content station may be a radio station KBAY-FM that primarily broadcasts music. In other examples, the content station may be a radio station that primarily broadcasts sports, a radio station that broadcasts both music and news, a TV broadcast with video and audio, etc.

The JSON Serialized Persona 600 may include a persona schema that describes the structure of the persona for the content station. For example, type 1 may be a root level 0, type 2 may be a genre level 1, type 3 may be an era level 2, and so forth.

Figure 6B:
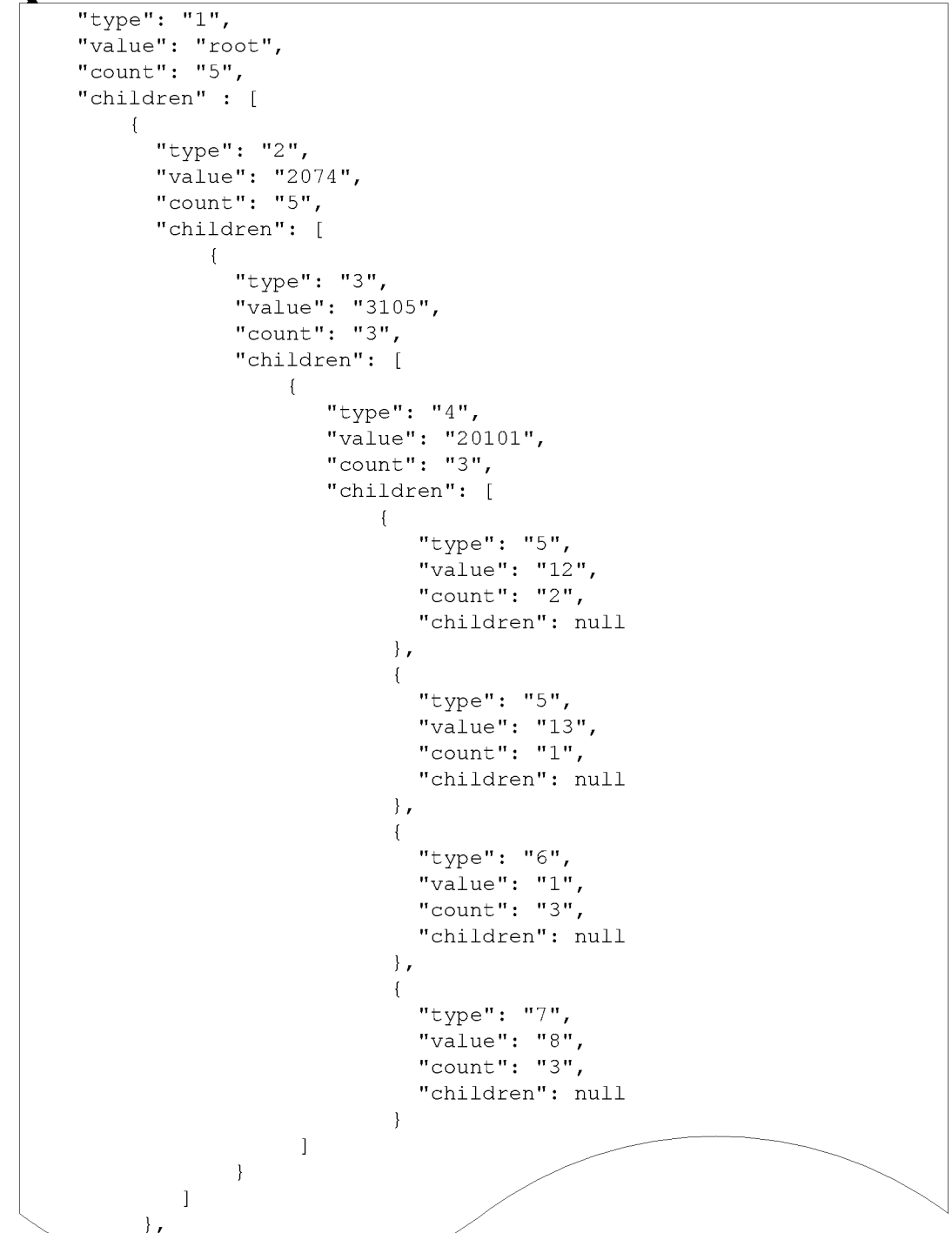
Figure 6C:
Figure 6D:
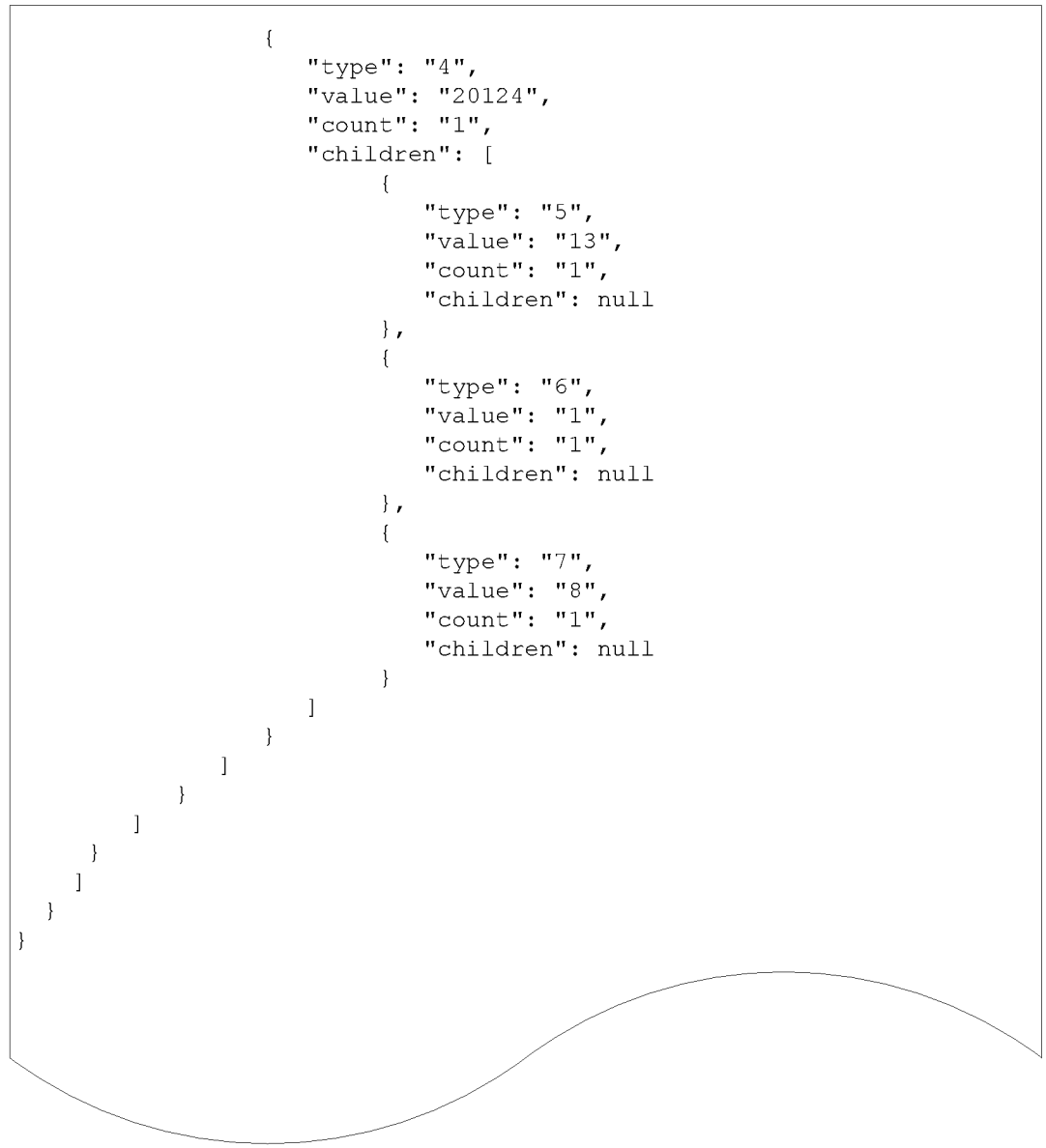

FIGS. 6B-6D show the data stored in the persona. For example, the data may start with a root at level 1. The count at the root level 1 may correspond to the number of entries (e.g., the number of songs that have been received in broadcast data) at that level. The "children" under the root may specify the number of entries for each genre, era, mood, etc. For example, type 2 corresponds to genre level 1. The value 2074 may correspond to the type of genre (e.g., rap, jazz, mainstream rock, etc.) and the count may correspond to how many songs have been played in that genre. Thus, if the value 2074 corresponds to mainstream rock, then the count indicates that 5 songs in the genre mainstream rock were broadcast on that content station. From this data a pattern may start to emerge of the type of media played on the content station.

In this way the persona for a content station is continually updated every time new broadcast data is received. From this data a profile of the content station may be generated. For example, using this data the system can generalize how many different genres, etc. are typically broadcast from a particular content station. Information, such as genre, era, and mood, of the content played by a content station can be aggregated to determine a profile that describes the type or types of content (e.g., music) that are generally played by the content station. In one example, the system may create a histogram based on the persona for the content station.

Content station profile data may then be used to provide recommendations to a user based on a user's content preferences. For example, if a user is determined to prefer country music or rock music, then a content station (or more than one content station) associated with country and rock music categories may be recommended to the user. Approaches for determining a user profile are described in application Ser. No. 13/611,740, filed Sep. 12, 2012, and entitled "User Profile Based on Clustering Tiered Descriptors," which is incorporated by reference herein. For example, it may be determined that a user prefers to listen to 80 percent rock music and 20 percent country music. The system 100 (e.g., server system 102 via profiling server 14) can compare the user profile to content station profiles. One or more content stations with a similar profile may be recommended to the user (e.g., a persona for a content station may indicate that the content station broadcasts 80 percent country music and 20 percent rock music). For example, if a histogram of the content station profile and a histogram of the user profile are similar (e.g., have a similar structure or pattern), the content station will have a higher score. If they are not similar, the content station will have a lower score. Content stations with a higher score may be recommended to the user.

For example, the system 100 (e.g., server system 102) may obtain a listing of content (e.g., music, videos, etc.) associated with the user 106 operating the client device 110. The listing of content may include, for example, various content that the user 106 has previously accessed (e.g., listened to or viewed), purchased (for example, through an electronic marketplace), or stored on the client device 110, for example, in a digital content library. The system 100 can analyze the content included in, or referenced by, the listing of content, as described above, to determine a profile describing various categories (e.g., genre, era, mood, etc.) to which content in the listing of content corresponds. Such category information (e.g., genre, era, mood, etc.) for the content associated with the user 106 may be aggregated to determine a respective profile that describes the type or types of content (e.g., music) that may be generally accessed by the user 106.

As mentioned, the system 100 can recommend content stations to users based at least in part on a user's content preferences as determined by the user's profile. For example, the system 100 (e.g., via the profiling server 124) can perform a pairwise comparison of a content station's profile and the user's profile to determine whether the two match (or are similar). Such a match may be determined by determining a respective overlap of categories (genre, era, mood, etc.) described by the profiles. For example, a profile of a radio station XYZ may indicate that the station plays music in the "rock" genre from the 80s era having a generally upbeat mood. The profiling server 124 may evaluate the profile of the user 106 to determine that the user also listens to music in the "rock" genre from the 80s era having a variety of moods. In this example, the profiling server 124 may determine that the radio station XYZ should be recommended to the user 106 as a possible radio station of interest to the user 106.

In some embodiments, the profiling server 124 may determine respective percentages of overlap between categories described by the profile of the radio station XYZ and the profile of the user 106. For example, the profiling server 124 may determine that 75 percent of the music played by the radio station XYZ is in the "classic rock" genre and that 70 percent of the music listened to by the user 106 is in the "classic rock" genre. In this example, assuming a threshold of +5 percent or −5 percent, the profiling server 124 may recommend the radio station XYZ to the user 106. Various other approaches for matching content stations to users may be utilized in accordance with the embodiments described herein.

A user interface may utilize profiled content stations, in accordance with various embodiments. The interface can be accessed, for example, through a web browser or a software application running on a client device 110. In some embodiments, the interface can be accessed through electronic components in a vehicle, as described below. The interface may include multiple interfaces. For example, a first interface may include a first region in which the user can select options for playing music, for example, from a digital music library or by accessing content stations (e.g., AM/FM radio, satellite radio, Internet-based content streams, etc.). The interface may also include a second region in which the user may perform operations for the content being played (e.g., play, pause, rewind, fast forward, etc.).

A second interface may present a listing of a number of content stations (e.g., 10) that are available. Each of the content stations may be categorized into genres, as described above, thereby allowing the user to quickly locate content stations that play content in line with the user's interests.

A third interface may allow a user to select content for playing based on mood. In this example, the user may specify what mix of content should correspond to the moods "calm," "positive," "energetic," and "dark." Based on this selection, radio stations that have been categorized or associated with the selected moods may be identified and provided to the user through the interface as a listing of recommended radio stations.

A fourth interface may allow a user to select content for playing based on genre. In this example, the user may specify what mix of content should correspond to certain genres. Based on this selection, radio stations that have been categorized or associated with the selected genres may be identified and provided to the user through the interface as a listing of recommended radio stations. In some implementations, content for the selected genres is further refined based on the moods selected in the third interface.

A fifth interface may provide a listing of channels that correspond to various categories (e.g., genre, era, mood, etc.) or styles of music (e.g., "80s New Wave Pop"). These channels may be determined by analyzing content played by radio stations, as described below, and clustering radio stations that play content that corresponds to the same or similar categories or styles. Such a listing may be presented to users, for example, through the interface to allow users to easily select content for playing.

A sixth interface may provide a listing of profiles that correspond to various users. One or more profiles may be selected through the interface and, in response, the interface may present content, channels, radio stations, etc., that match the user's profile (e.g., user's preferences or taste).

Moreover, the system 100 may provide notifications, in accordance with embodiments described herein. A user interface may be provided to a user with a notification, such as a notification of any nearby points of interest such as movie theaters that are within a threshold geographic distance from the user and any movies that are playing at those theaters. In another embodiment, notifications can be provided to a user providing information identifying the showing times for a movie that is playing at a movie theater. In some embodiments, a user accessing the interface can book movie tickets directly through the interface by selecting a showing time.

Visual or audible notifications for any updates that are determined to be of interest to a user can also (or alternatively) be presented to the user. For example, a visual notification indicating a football game update (e.g., "Philadelphia turnover by John Smith (#25 RB)") may be presented while the user is accessing the interface to view movie show times. Such visual notifications may be provided as pop-ups or as a banner notification that is displayed in a portion of the interface.

In some instances, the content stations may be radio stations that transmit content within some geographic region. In such instances, when recommending radio stations to the user 106, the system 100 may determine a geographic region within which the user 106 is located and recommend radio stations that broadcast or transmit content to the geographic region of the user 106.

In some embodiments, vehicles (e.g., automobiles) may be equipped with electronic components that are configured to determine any profiles associated with a user or users in the vehicle and recommend content stations (e.g., AM/FM radio, satellite radio, etc.) based on the profiles. For example, users that are in the vehicle may be determined by any computing devices (e.g., mobile phones, hardware devices such as key fobs, etc.) associated with the users being within a geofence of the vehicle. Alternatively, the user or users may sign in through an interface provided by the electronic components to indicate their presence.

In one example, when a user operating a car drives to an unfamiliar location (for example, on road trip), the radio station pre-sets on the car's stereo may be automatically set based on a comparison of the user's profile and the profile of the available radio stations for that location, as described above. In another example, when the user rents a car that has various pre-sets that were not set by the user, the radio station pre-sets on the rental car's stereo may be automatically set based on a comparison of the user's profile and the profile of the available radio stations for that location, as described above. In some instances, the system 100 may recommend radio stations to the user based on the radio pre-sets that are already set for the user's car stereo.

In various embodiments, vehicles (e.g., automobiles) may be equipped with electronic components that are configured to determine the types of information users listen to while in their vehicle. Some examples of such information may describe any sports, sports teams, weather data, news updates, etc., that are of interest to the user. In some implementations, such information may be presented to the user as a visual or audible interruption or notification while the user is listening to music. For example, the user may be listening to music being played by a radio station. The electronic components and/or the system 100 may determine that a different station is providing a radio broadcast of a sports game that is of interest to the user. In this example, visual or audible notifications can be presented to the user when a game update (e.g., update to the score or some other milestone for the sport) occurs. In some implementations, when the electronic components and/or the system 100 determine that a different station is providing a radio broadcast of a sports game that is of interest to the user, a radio pre-set may be set to the different radio station to provide the user with access to the different station using the pre-set.

In another example, a user may be listening to a first content station with a particular profile. The system may recommend another station(s) to the user with a similar profile. Approaches described herein may provide for using radio station profiles to branch off to other content sources, either due to diversion of the radio program (e.g., different broadcast program with different style of music, ad break, talk program, etc.), or departure from radio coverage area (e.g., entering a tunnel, mountains, desert, entering a geofence without a suitable radio station, etc.). The techniques may be achieved by playing songs fitting the most recent radio profile, for example from a local collection, a tethered device (e.g., mobile phone), or an Internet service, or using the profile information to seed an Internet streaming service. In an embodiment, this can be accomplished by seeding with the profile parameters directly (e.g., genre, era, mood, etc.) or with artists or songs that are representative of said profile (e.g., query-by example), in addition to other approaches.

Embodiments described may provide for the ability to automatically change a content station to one currently playing a desired song. For example, the system may know the songs currently playing on all stations, which may allow the ability to tune dynamically to different stations as desired content is aired. This may also allow the system to do more intelligent radio tuning to avoid changing to stations that are, for example, playing a song that doesn't match a user profile, not currently playing songs (advertisement or talk show, etc.), and/or are currently playing the same song as a current station.

Content stations may change or vary over time. For example, a content station that primarily plays alternative music may, over time, play more rock music than alternative music. In another example, a content station may change broadcast content during particular seasons (e.g., to play Christmas music during the Christmas holiday season, to broadcast football during football season, etc.). The system may provide a "de-weighting" or "forgetting" function providing decay to address the issue that content stations may vary over time.

One example for keeping the content station persona and profile current is for the system to purge older data periodically. For example, the system may only store data for a predetermined period of time (e.g., 4 weeks, 3 months, 6 months, 1 year, etc.) and purge any data dated before that period of time. If the system determines that particular data in a persona is dated (e.g., in time context data) before the predetermined period of time, it may delete the data from the persona and recalculate the profile for the content station.

Another example for keeping the content station persona and profile current is for the system to purge data that occurs in the least frequently occurring pattern. For example, the system may only store data until it reaches a predetermined size (e.g., 100 megabytes, etc.) in memory. If the system determines that particular size has been reached, the system may delete older data (as described above) until the size is under the predetermined size, or the system may prune data that occurs in the least frequently occurring pattern. For example, if there is a particular genre, era, mood, etc. that only appears once in the persona, that node may be deleted.

In addition or alternatively to broadcast data, the broadcast monitoring server 132 may utilize client devices 110 as a distributed monitoring system. In various embodiments, when a sufficient number of mobile devices and/or car head units are deployed in a given area, the devices can act as a distributed monitoring system. In addition to the device providing a device/user identifier and fingerprint at time of query, the frequency/source of the radio channel and geo location of the device may also be provided to establish the range/coverage of the radio station of interest. In an example, the system first checks if a device has recently (e.g., within several seconds) queried the same channel from the same geo location. In an embodiment, a verification of the most recently recognized reference fingerprint will be sufficient, making the look-up much more efficient and affordable. With enough devices to statistically cover all stations of interest in a given area, listening stations can be replaced completely in these areas.

Devices so configured can also maintain a history and build the station persona or profile locally. In an example, devices keep track of recently recognized audio (and associated attributes) in the device to build the persona or profile. In some examples, at first the device may only be able to identify the item that is currently playing, which may lead to a narrow and specific profile; however, over time the profile will become more representative of the station's overall profile. The device can also maintain frequency and geo location data, and possibly Radio Data Station ("RDS") or other station identifying metadata, and thus memorize a station's profile over longer periods of time (e.g., days, weeks, months). For longer periods of time, the system may have a "de-weighting" or "forgetting" function providing decay (as described above), as a radio station can vary its profile over time. In some embodiments, user profiles may be created and/or determined by existing preset preferences, once the profiles for those stations are already known. While a station's profile may change over time, (e.g., holiday music during a particular season), a user's profile could change over time as well; therefore, determining time, season, upcoming holidays, etc., may be utilized in profiling for both stations and users.

Figure 7:
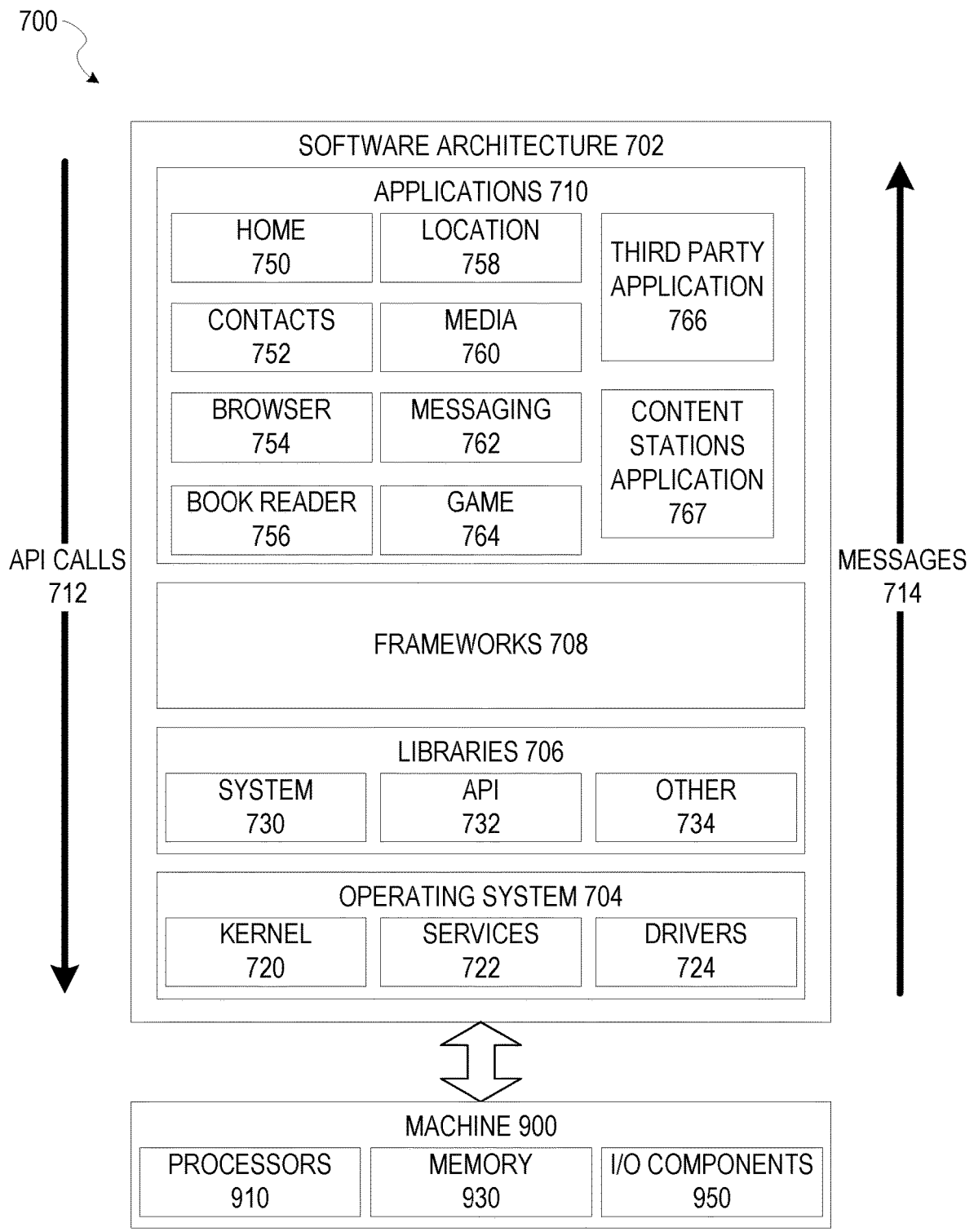
FIG. 7 is a block diagram illustrating an example of a software architecture that may be installed on a machine, according to some example embodiments, configured to profile content stations.

FIG. 7 is a block diagram 700 illustrating an architecture of software 702, which can be installed on any one or more of the devices described above. For example, in various embodiments, the client devices 110, server system 102, API server 120, web server 122, profiling server 124, broadcast monitoring system 130, and broadcast monitoring server 132 may be implemented using some or all of the elements of the software architecture 702. FIG. 7 is merely a non-limiting example of a software architecture, and it will be appreciated that many other architectures can be implemented to facilitate the functionality described herein. In various embodiments, the software architecture 702 is implemented by hardware such as a machine 900 of FIG. 8 that includes processors 910, memory 930, and I/O components 950. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party application 766 and content stations application 767. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include a content stations application 767. In certain embodiments, this may be a standalone application that operates to manage communications with a server system such as the broadcast monitoring server 132 or the server system 102. In other embodiments, this functionality may be integrated with another application such as a location application, media application, radio station application, application in a vehicle, or another such application. The content stations application 767 may request and display various types of media content information (e.g., content stations information, recommendations for content stations, currently playing or viewing media content or content stations information, etc.) and may provide the capability for a user to input data related to media content and content stations via a touch interface, keyboard, or camera device of the machine 900; communication with a server system via the I/O components 950; and receipt and storage of media content and content stations data in the memory 930. Presentation of media content and content stations information, and user inputs associated with the same, may be managed by the content stations application 767 using different frameworks 708, library 706 elements, or operating system 704 elements operating on the machine 900.

Figure 8:
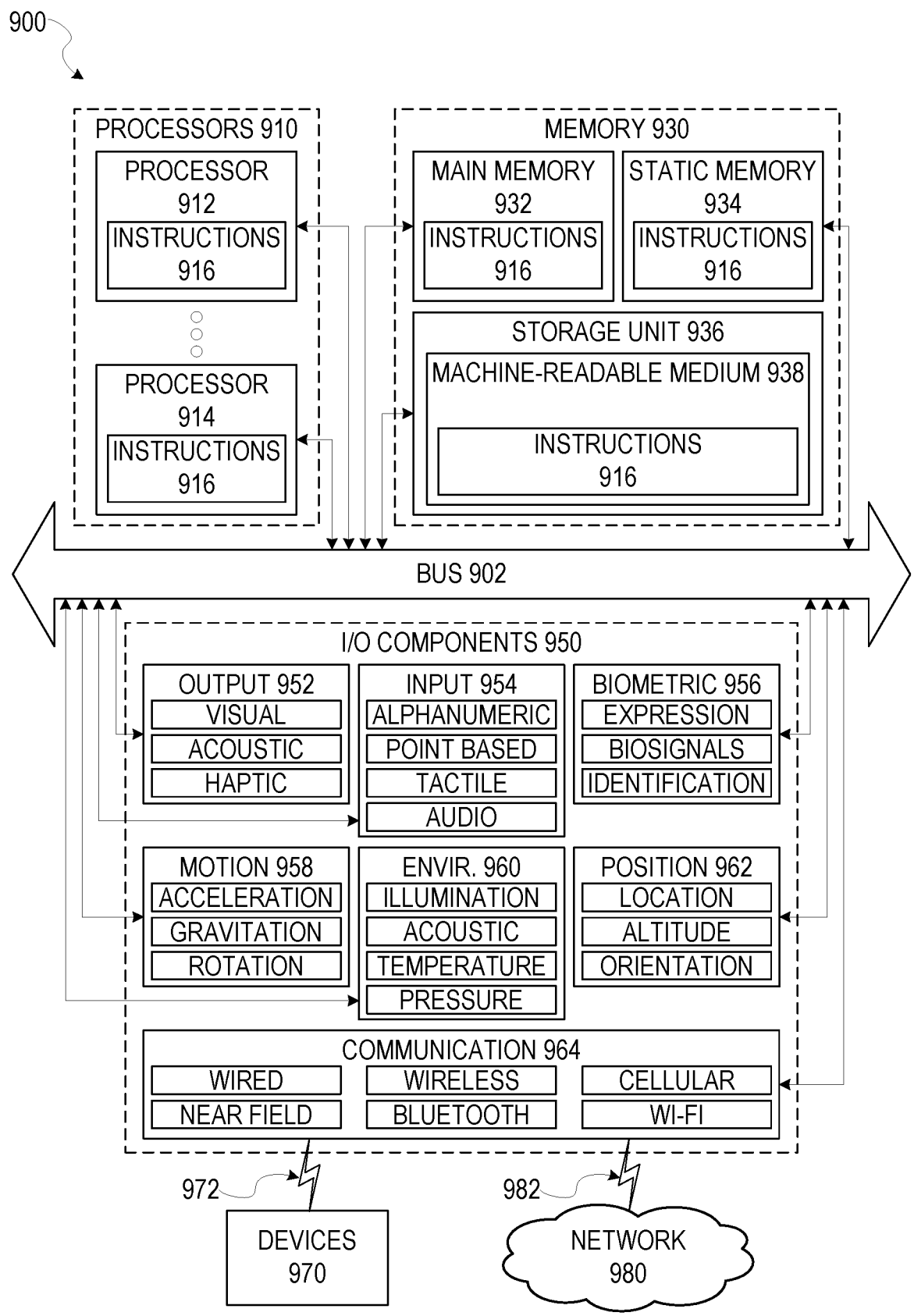
FIG. 8 is a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 900, according to some embodiments, able to read instructions from a machine-readable medium (e.g., a machine-readable storage medium) and perform any one or more of the methodologies discussed herein. Specifically, FIG. 8 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server system 102, API server 120, web server 122, profiling server 124, broadcast monitoring system 130, broadcast monitoring server 132, or client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 8 shows multiple processors 910, the machine 900 may include a single processor 910 with a single core, a single processor 910 with multiple cores (e.g., a multi-core processor 910), multiple processors 912, 914 with a single core, multiple processors 910, 912 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 8. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the machine-readable medium 938 should be considered as being transportable from one physical location to another. Additionally, since the machine-readable medium 938 is tangible, the machine-readable medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus comprising:
   a memory storing instructions; and
   a processor configured to execute the instructions stored in the memory to:
   compare a preference included in a user profile with a portion of a content station profile to determine whether the preference included in the user profile satisfies a threshold difference from the portion of the content station profile, the content station profile including (1) a first characteristic of first broadcast data associated with a first time context and a first count associated with first identifying information and (2) a second characteristic of second broadcast data associated with a second time context and a second count associated with second identifying information;
   in response to the threshold difference being satisfied, generate a station recommendation for a user associated with the user profile; and
   transmit an instruction to a device associated with the user, the instruction including the station recommendation, the instruction configured to cause a radio pre-set to be adjusted.

2. The apparatus of claim 1, wherein the first characteristic is at least one of a first genre, a first era, or a first mood of the first broadcast data, and wherein the second characteristic is at least one of a second genre, a second era, or a second mood of the second broadcast data.

3. The apparatus of claim 1, wherein the instructions, when executed, cause the processor to detect a change in content in the first broadcast data or the second broadcast data in response to a change from a first song to a second song.

4. The apparatus of claim 3, wherein the instructions, when executed, cause the processor to:
   determine at least one of a time, season, or holiday associated with the change; and
   store the at least one of the time, season, or holiday associated with the change in the content station profile.

5. The apparatus of claim 1, wherein the first broadcast data and the second broadcast data are received at a server computer from a listening station.

6. The apparatus of claim 1, wherein the first identifying information associated with the first broadcast data includes at least one of: a song identifier, a track unique identifier, a track title, an album title, and an artist name.

7. The apparatus of claim 1, wherein the first time context or the second time context includes at least one of (a) an hour of a day, (b) a day of a week, or (c) a month of a year.

8. A non-transitory computer-readable medium comprising instructions stored thereon that are executable by at least one processor to cause a computing device to:
   compare a preference included in a user profile with a portion of a content station profile to determine whether the preference included in the user profile satisfies a threshold difference from the portion of the content station profile, the content station profile including (1) a first characteristic of first broadcast data associated with a first time context and a first count associated with first identifying information and (2) a second characteristic of second broadcast data associated with a second time context and a second count associated with second identifying information;
   in response to the threshold difference being satisfied, generate a station recommendation for a user associated with the user profile; and
   transmit an instruction to a device associated with the user, the instruction including the station recommendation, the instruction configured to cause a radio pre-set to be adjusted.

9. The non-transitory computer-readable medium of claim 8, wherein the first characteristic is at least one of a first genre, a first era, or a first mood of the first broadcast data, and wherein the second characteristic is at least one of a second genre, a second era, or a second mood of the second broadcast data.

10. The non-transitory computer-readable medium of claim 8, wherein the instructions, when executed, cause the computing device to detect a change in content in the first broadcast data or the second broadcast data in response to a change from a first song to a second song.

11. The non-transitory computer-readable medium of claim 10, wherein the instructions, when executed, cause the computing device to:
    determine at least one of a time, season, or holiday associated with the change; and
    store the at least one of the time, season, or holiday associated with the change in the content station profile.

12. The non-transitory computer-readable medium of claim 8, wherein the first broadcast data and the second broadcast data are received at a server computer from a listening station.

13. The non-transitory computer-readable medium of claim 8, wherein the instructions, when executed, cause the computing device to:
    determine a geographic region in which the user is located; and
    determine that a first content station transmits content receivable within the geographic region.

14. A method comprising:
    comparing a preference included in a user profile with a portion of a content station profile to determine whether the preference included in the user profile satisfies a threshold difference from the portion of the content station profile, the content station profile including (1) a first characteristic of first broadcast data associated with a first time context and a first count associated with first identifying information and (2) a second characteristic of second broadcast data associated with a second time context and a second count associated with second identifying information;
    in response to the threshold difference being satisfied, generating a station recommendation for a user associated with the user profile; and
    transmitting an instruction to a device associated with the user, the instruction including the station recommendation, the instruction configured to cause a radio pre-set to be adjusted.

15. The method of claim 14, wherein the first characteristic is at least one of a first genre, a first era, or a first mood of the first broadcast data, and wherein the second characteristic is at least one of a second genre, a second era, or a second mood of the second broadcast data.

16. The method of claim 14, further including detecting a change in content in the first broadcast data or the second broadcast data in response to a change from a first song to a second song.

17. The method of claim 16, further including:
- determining at least one of a time, season, or holiday associated with the change; and
- storing the at least one of the time, season, or holiday associated with the change in the content station profile.

18. The method of claim 14, wherein the first broadcast data and the second broadcast data are received at a server computer from a listening station.

19. The method of claim 14, wherein the first identifying information associated with the first broadcast data includes at least one of: a song identifier, a track unique identifier, a track title, an album title, and an artist name.

20. The method of claim 14, wherein the first time context or the second time context includes at least one of (a) an hour of a day, (b) a day of a week, or (c) a month of a year.

* * * * *